US012680971B2

(12) United States Patent
Suzuki et al.

(10) Patent No.: US 12,680,971 B2
(45) Date of Patent: Jul. 14, 2026

(54) ANALYSIS SYSTEM, ANALYSIS DEVICE, AND CONTROL METHOD

(71) Applicant: SHIMADZU CORPORATION, Kyoto (JP)

(72) Inventors: Keijiro Suzuki, Kyoto (JP); Mika Sato, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 71 days.

(21) Appl. No.: 18/291,810

(22) PCT Filed: Mar. 17, 2022

(86) PCT No.: PCT/JP2022/012108
§ 371 (c)(1),
(2) Date: Jan. 24, 2024

(87) PCT Pub. No.: WO2023/007826
PCT Pub. Date: Feb. 2, 2023

(65) Prior Publication Data
US 2025/0067690 A1 Feb. 27, 2025

(30) Foreign Application Priority Data
Jul. 29, 2021 (JP) ................................. 2021-124201

(51) Int. Cl.
*G01N 23/2204* (2018.01)
*G01N 23/223* (2006.01)
*G01N 35/00* (2006.01)

(52) U.S. Cl.
CPC ....... *G01N 23/2204* (2013.01); *G01N 23/223* (2013.01); *G01N 35/00722* (2013.01);
(Continued)

(58) Field of Classification Search
CPC ............. G01N 23/2204; G01N 23/223; G01N 2223/076; G01N 2223/1016;
(Continued)

(56) References Cited

U.S. PATENT DOCUMENTS 7,727,469 B2 * 6/2010 Takahashi .............. G01N 35/02
422/63
8,097,211 B2 1/2012 Hamada et al.
(Continued)

FOREIGN PATENT DOCUMENTS

CN 1847822 B * 12/2012 ......... G01N 35/1002
DE 112010001712 T5 8/2012
(Continued)

OTHER PUBLICATIONS

PCT Written Opinion of the International Searching Authority dated May 31, 2022.
(Continued)

*Primary Examiner* — Thomas R Artman
(74) *Attorney, Agent, or Firm* — Muir Patent Law, PLLC

(57) ABSTRACT
A locking device locks the sample tray to the mounting unit at a position where none of the plurality of sample containers on the sample tray can be replaced. The locking device locks the sample tray during an operation period from the start of a measurement operation on the sample tray to measure samples in the plurality of sample containers until the end of the measurement operation. The information processing apparatus includes a storage unit for storing, for each user, a set value for authorization to unlock the sample tray during the operation period. The information processing apparatus determines, based on the set value, whether to unlock the sample tray during the operation period. The locking device unlocks the sample tray during the operation period, based on the determination of the information.

8 Claims, 8 Drawing Sheets

(52) U.S. Cl.
CPC ... *G01N 35/0092* (2013.01); *G01N 2223/076* (2013.01); *G01N 2223/1016* (2013.01); *G01N 2223/306* (2013.01)

(58) Field of Classification Search
CPC ....... G01N 2223/306; G01N 35/00584; G01N 35/00722; G01N 35/0092
See application file for complete search history.

(56) References Cited

U.S. PATENT DOCUMENTS

| | | | | |
|---|---|---|---|---|
| 8,883,509 | B2 * | 11/2014 | Lemme | G01N 1/312 422/563 |
| 8,904,479 | B1 | 12/2014 | Johansson et al. | |
| 10,466,262 | B2 * | 11/2019 | Goemann-Thoss | G01N 35/00871 |
| 11,760,968 | B2 * | 9/2023 | Riemer | C12M 37/04 435/303.1 |
| 2004/0208787 | A1 * | 10/2004 | Takahashi | G01N 35/02 422/64 |
| 2004/0241044 | A1 * | 12/2004 | Mordekhay | G01N 35/00732 422/65 |
| 2006/0000296 | A1 * | 1/2006 | Salter | G01N 35/00732 73/864.91 |
| 2009/0017491 | A1 * | 1/2009 | Lemme | G01N 1/312 435/40.52 |
| 2012/0112064 | A1 | 5/2012 | Nagakubo et al. | |
| 2015/0125961 | A1 * | 5/2015 | Goemann-Thoss | G01N 35/00871 422/67 |
| 2016/0363605 | A1 * | 12/2016 | Liepold | F24F 3/167 |
| 2020/0277562 | A1 * | 9/2020 | Riemer | C12M 41/00 |
| 2024/0027375 | A1 * | 1/2024 | Okada | G01N 35/0099 |
| 2025/0067690 | A1 * | 2/2025 | Suzuki | G01N 23/2204 |

FOREIGN PATENT DOCUMENTS

| | | | | |
|---|---|---|---|---|
| JP | 2016106214 | A * | 6/2016 | ....... G01N 35/00663 |
| WO | 2018017771 | A1 | 1/2018 | |
| WO | 2020/044399 | A1 | 3/2020 | |

OTHER PUBLICATIONS

Office Action dated May 15, 2026 for corresponding application No. DE 11 2022 003 111.5.

Office Action dated May 19, 2026, for corresponding application No. IN 202447012422.

* cited by examiner

FIG.5

| User information | | Unlocking authority | | |
|---|---|---|---|---|
| Belonging group | User name | All users (Administrator authority) | Belonging group (Group authority) | User (User authority) |
| Group X | User X1 | ○ | ○ | ○ |
| Group A | User A1 | ○ | ○ | ○ |
| Group A | User A2 | × | ○ | ○ |
| Group A | User A3 | × | × | ○ |
| Group B | User B1 | ○ | ○ | ○ |
| Group B | User B2 | × | ○ | ○ |
| Group B | User B3 | × | × | ○ |
| Group C | User C1 | ○ | ○ | ○ |
| Group C | User C2 | × | ○ | ○ |
| Group C | User C3 | × | × | ○ |
| Group C | User C4 | × | × | × |

FIG.6

| No. | Consecu-tive mea-surement | User name | Sample tray name | Sample No. (sample name) | Execution state | Locking state |
|-----|------|-----------|------------------|--------------------------|-----------------|---------------|
| 1 | 1 | User A1 | Sample tray 1A | 1(Sample X1) | Completed | Locked |
| 2 | | User A1 | Sample tray 1A | 2(Sample X2) | Completed | Locked |
| 3 | | User A1 | Sample tray 1A | 3(Sample X3) | Completed | Locked |
| 4 | | User A1 | Sample tray 1A | 4(Sample X4) | Executing | Locked |
| 5 | | User A1 | Sample tray 1A | 5(Sample X5) | Standby | Locked |
| 6 | | User A1 | Sample tray 1A | 6(Sample X6) | Standby | Locked |
| 7 | 2 | User B3 | Sample tray 2A | 1(Sample Y1) | Standby | − |
| 8 | | User B3 | Sample tray 2A | 2(Sample Y2) | Standby | − |
| 9 | | User B3 | Sample tray 2A | 3(Sample Y3) | Standby | − |
| 10 | | User B3 | Sample tray 2A | 4(Sample Y4) | Standby | − |
| 11 | | User B3 | Sample tray 2A | 5(Sample Y5) | Standby | − |
| 12 | | User B3 | Sample tray 2A | 6(Sample Y6) | Standby | − |
| 13 | | User B3 | Sample tray 2A | 7(Sample Y7) | Standby | − |
| 14 | | User B3 | Sample tray 2A | 8(Sample Y8) | Standby | − |
| 15 | | User B3 | Sample tray 2B | 1(Sample Z1) | Standby | − |
| 16 | | User B3 | Sample tray 2B | 2(Sample Z2) | Standby | − |
| 17 | | User B3 | Sample tray 2B | 3(Sample Z3) | Standby | − |
| 18 | | User B3 | Sample tray 2B | 4(Sample Z4) | Standby | − |
| 19 | | User B3 | Sample tray 2B | 5(Sample Z5) | Standby | − |

FIG.7

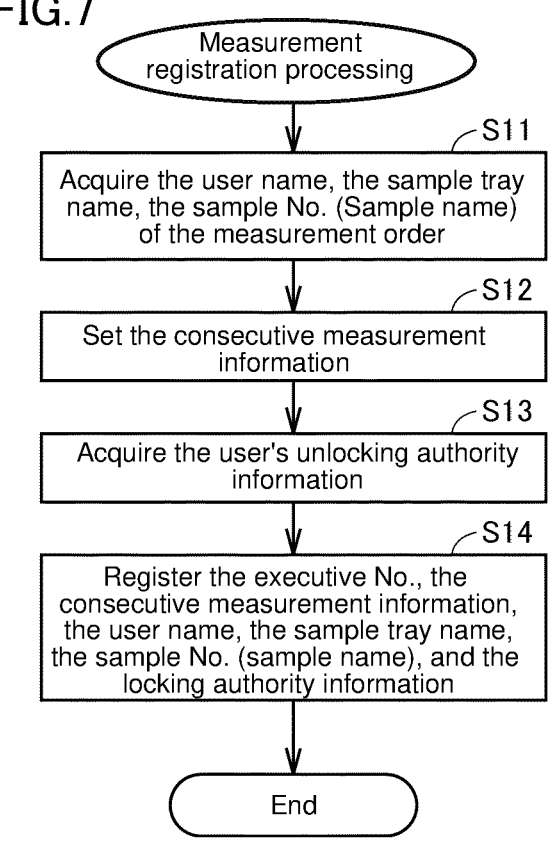

Measurement
registration processing

S11

Acquire the user name, the sample tray
name, the sample No. (Sample name)
of the measurement order

S12

Set the consecutive measurement
information

S13

Acquire the user's unlocking authority
information

S14

Register the executive No., the
consecutive measurement information,
the user name, the sample tray name,
the sample No. (sample name), and the
locking authority information End

FIG.8

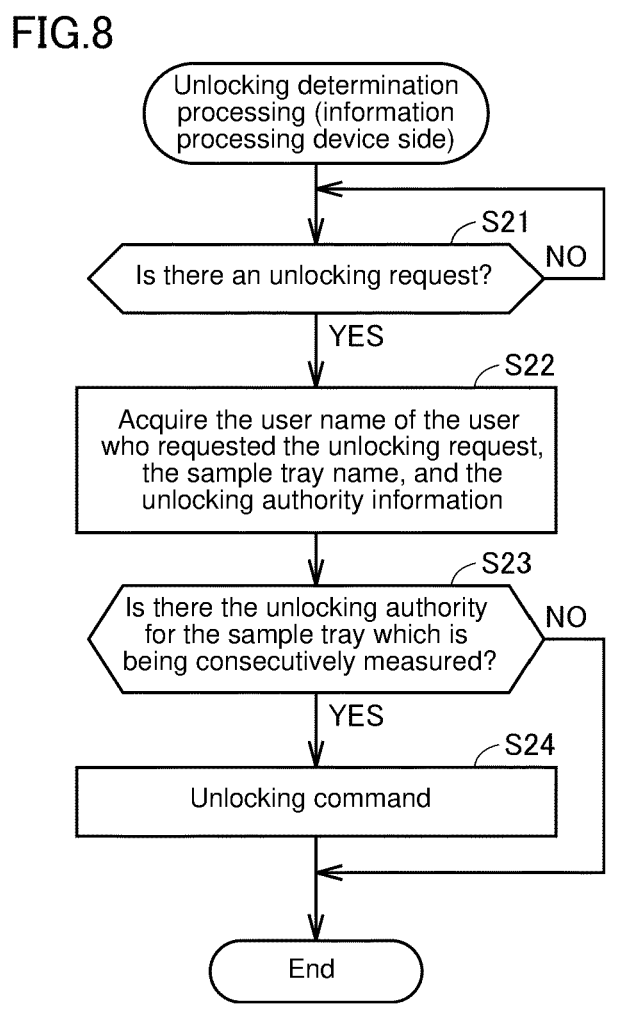

Unlocking determination processing (information processing device side)

S21
Is there an unlocking request?    NO

YES

S22
Acquire the user name of the user who requested the unlocking request, the sample tray name, and the unlocking authority information S23
Is there the unlocking authority for the sample tray which is being consecutively measured?    NO

YES

S24
Unlocking command

End

ANALYSIS SYSTEM, ANALYSIS DEVICE, AND CONTROL METHOD

TECHNICAL FIELD

The present disclosure relates to an analysis system, an analysis device, and a control method.

BACKGROUND ART

An analysis device for analyzing a sample by measuring the sample is known. As one of analysis devices, there is an X-ray fluorescence analysis device. An X-ray fluorescence analysis device is used to analyze constituent elements of a sample by irradiating the sample with X-rays and measuring fluorescence X-rays emitted from the sample. In the case of using an X-ray fluorescence analysis device, the sample must be measured in a shielded measurement chamber to prevent leakage of X-rays.

For measuring a plurality of samples in an X-ray fluorescence analysis device, there is a method in which the samples are measured by manually replacing one by one. In the case of automatically performing consecutive measurements, there is a method of measuring a plurality of samples while rotating a turret in a measurement chamber. In this case, the measurement chamber is locked to prevent X-ray leakage during the consecutive measurements, and therefore, it is not possible to add or replace samples during the consecutive measurements. On the other hand, International Publication No. WO 2020/044399 (Patent Document 1) discloses a method for consecutively measuring a plurality of samples by moving the sample from the standby position to the measurement chamber using a conveyance device, measuring the sample, then returning the sample to the standby position again, and repeating this process.

PRIOR ART DOCUMENT

Patent Document

Patent Document 1: International Publication No. WO 2020/044399

SUMMARY OF THE INVENTION

Problems to be Solved by the Invention

In a device using a turret to measure samples, subsequent consecutive measurements cannot be initiated until after completion of a registered series of consecutive measurements. On the other hand, in a device for measuring a sample using such a conveyance device as described in Patent Document 1, a sample addition or replacement can be performed even during consecutive measurements by shielding the measurement chamber to avoid the leakage of X-rays when measuring the sample. However, in pharmaceutical industries and the like, data integrity is required to be maintained. For this reason, if a third party can freely add or replace samples even if the measurement sequence has been registered and consecutive measurements are being performed, data integrity cannot be maintained, which is a problem.

The present disclosure has been made in view of the above-described circumstances, and one of the objects of the present disclosure is to provide an analysis system capable of suitably performing measurements by a plurality of users while maintaining data integrity in a case of measuring a plurality of samples.

Means for Solving the Problems

An analysis system according to one aspect of the present disclosure is provided with an analysis device and an information processing apparatus. The analysis device analyzes a sample. The information processing apparatus is connected to the analysis device. The analysis device includes a sample tray, a measurement device, a mounting unit, and a locking device. The sample tray is one or more trays configured to place a plurality of sample containers thereon. The measurement device measures samples in a plurality of sample containers for each sample container. A sample tray is placed on the mounting unit. A locking device locks the sample tray to the mounting unit at a position where none of the plurality of sample containers on the sample tray can be replaced. The locking device locks the sample tray during an operation period from a start of a measurement operation on the sample tray to measure samples in the plurality of sample containers until an end of the measurement operation. The information processing apparatus includes a storage unit for storing, for each user, a set value for authorization to unlock the sample tray during the operation period. The information processing apparatus determines whether to unlock the sample tray during the operation period based on the set value. The locking device unlocks the sample tray during the operation period, based on the determination of the information processing apparatus.

An analysis device according to another aspect of the present disclosure analyzes a sample. The analysis device includes a sample tray, a measurement device, a mounting unit, and a locking device. The sample tray is one or more trays each configured to place a plurality of sample containers thereon. The measurement device measures samples in a plurality of sample containers for each sample container. A sample tray is placed on the mounting unit. A locking device locks the sample tray to the mounting unit at a position where none of the plurality of sample containers on the sample tray can be replaced. The locking device locks the sample tray during an operation period from a start of a measurement operation on the sample tray to measure samples in the plurality of sample containers until an end of the measurement operation. The analysis device is connected to the information processing apparatus. The information processing apparatus includes a storage unit for storing, for each user, a set value for authorization to unlock the sample tray during the operation period. The information processing apparatus determines whether to unlock the sample tray during the operation period, based on the set value. The locking device unlocks the sample tray during the operation period, based on the determination of the information processing apparatus.

A control method according to another aspect of the present disclosure is a control method for an analysis system for analyzing a sample. The analysis system is provided with one or more sample trays each configured to place a plurality of sample containers thereon, a mounting unit configured to place the sample tray thereon, a measurement device configured to measure samples in the plurality of sample containers for each sample container, a locking device configured to lock the sample tray to the mounting unit at a position where none of the plurality of sample containers on the sample tray can be replaced, a sample storage unit configured to store a set value for authority to unlock the tray for each user. The control method includes: a step of locking the sample tray during an operation period from a start of a measurement operation on the sample tray to measure samples in a plurality of sample containers to an end of the measurement operation; a step of determining whether to unlock the sample trays during the operation period, based on a set value; and a step of unlocking the sample tray during the operation period based on the determination of the determination step.

Effects of the Invention

According to the present disclosure, data integrity can be maintained because the sample tray is locked to the mounting unit in a position where none of the plurality of sample containers on the sample tray can be replaced during the operation period from the start of the measurement operation for the sample tray to the end of the measurement operation to measure samples in the plurality of sample containers. In addition, the sample tray can be unlocked during the operation period based on the set value of the authorization to unlock the sample tray set for each user, which allows for the user having the authorization to unlock the sample tray and replace the sample containers. By configuring as described above, in the case of measuring a plurality of samples, it is possible for a plurality of users to perform the measurements suitably while maintaining data integrity.

BRIEF DESCRIPTION OF THE DRAWINGS

FIG. 5 is a diagram showing an example of registered user information and unlocking authority.

FIG. 6 is a diagram showing an example of a measurement schedule screen.

FIG. 7 is a flowchart showing measurement registration processing.

FIG. 8 is a flowchart showing unlocking determination processing (information processing apparatus side).

EMBODIMENTS FOR CARRYING OUT THE INVENTION

Hereinafter, some embodiments of the present disclosure will be described with reference to the attached drawings. Note that the same or equivalent part in the figures is assigned by the same reference symbol, and the description thereof will not be repeated.

[Analysis System 1]

Figure 1:
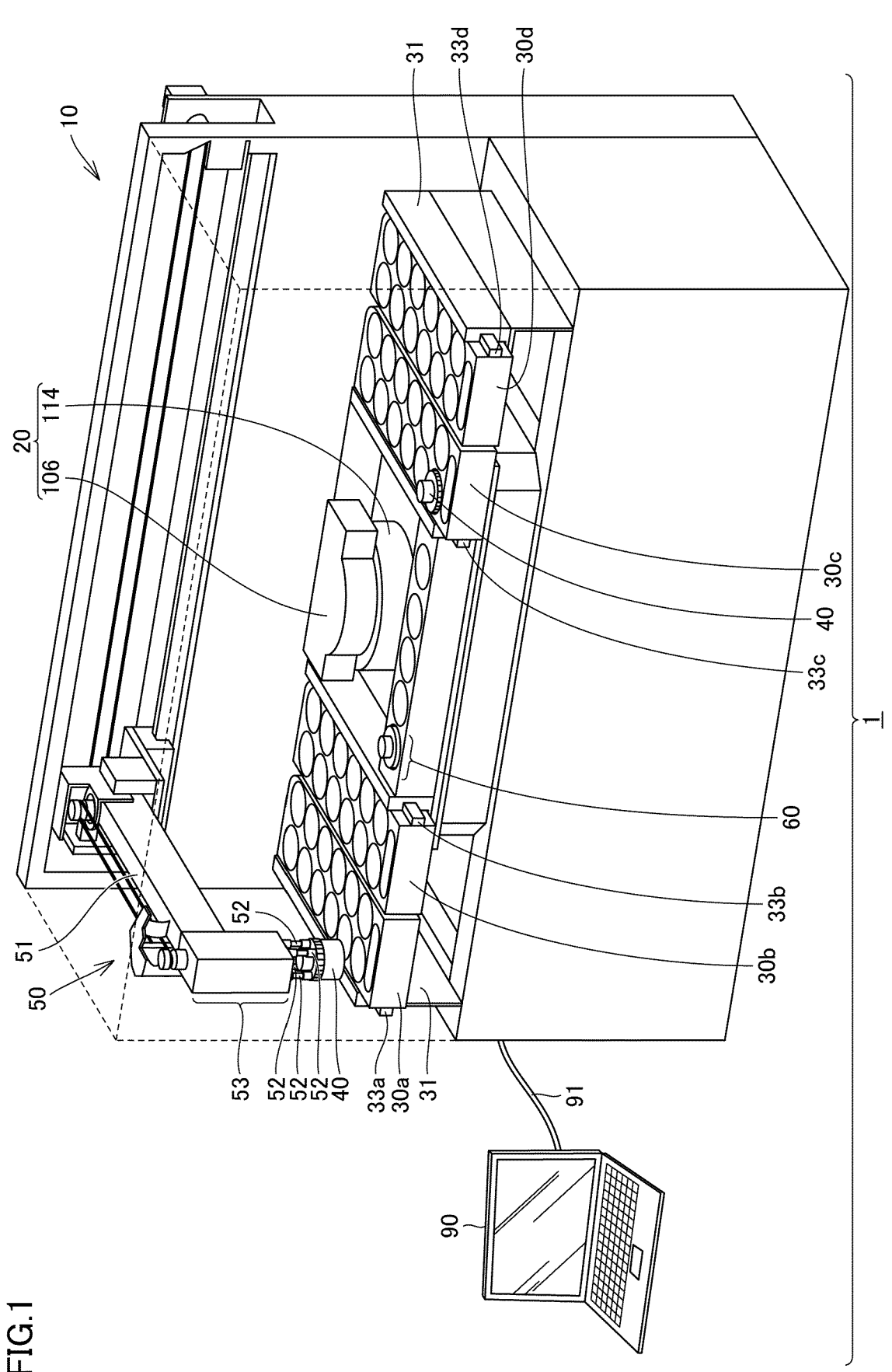
FIG. 1 is a diagram showing an analysis system according to this embodiment.
Figure 2:
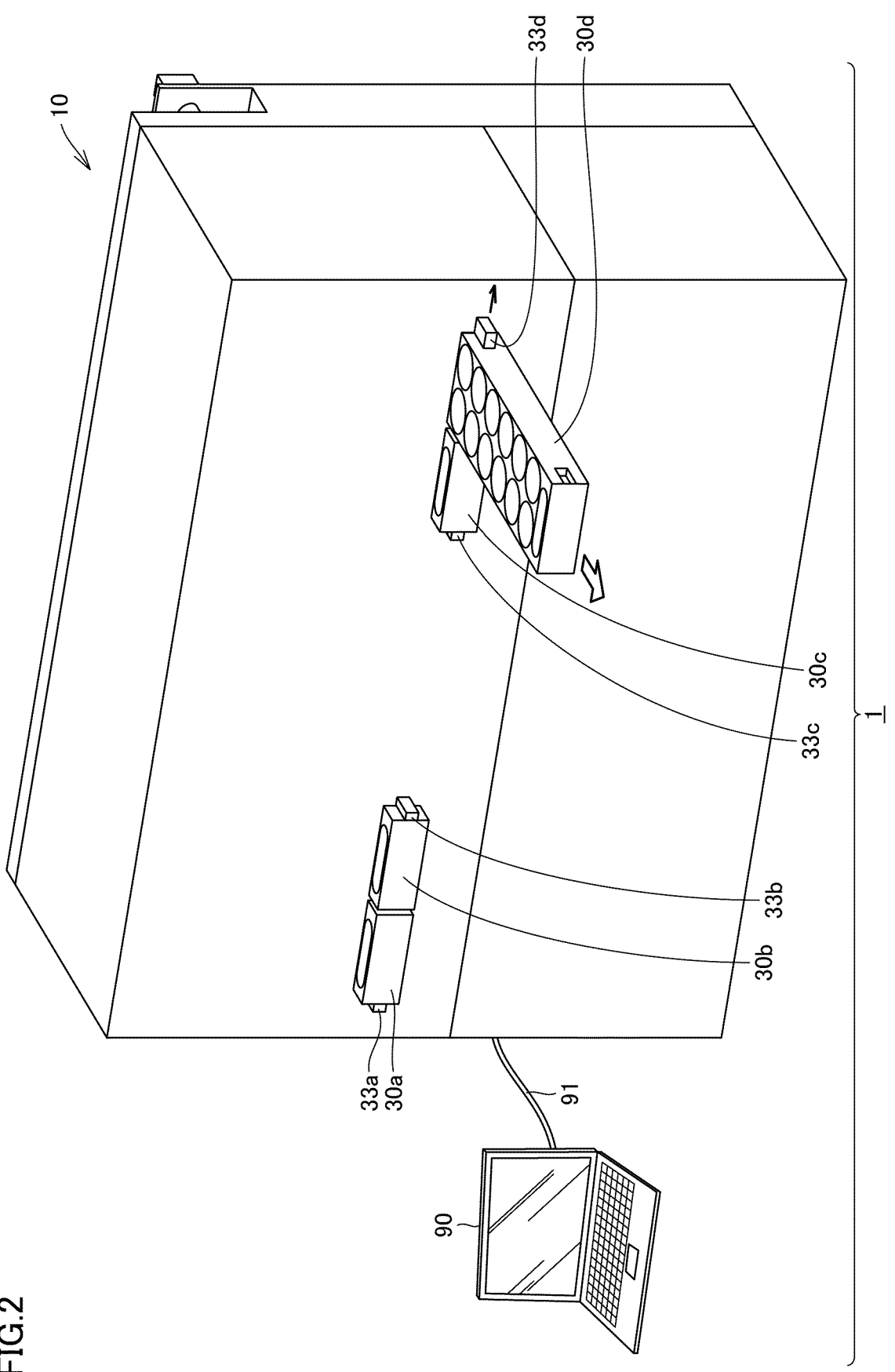
FIG. 2 is a diagram showing a state in which a sample tray of the analysis system is pulled out.
Figures 3, 4:
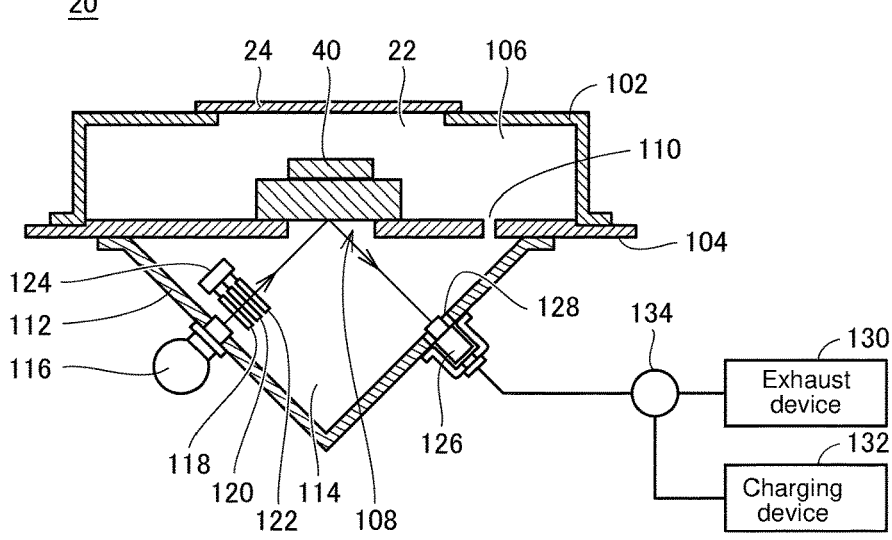
FIG. 3 is a diagram showing a control configuration of the analysis system.
FIG. 4 is a diagram showing a configuration example of a measurement device.

Referring to FIG. 1 to FIG. 3, the overall configuration of an analysis system 1 according to this embodiment is described. FIG. 1 is a diagram showing the analysis system 1 according to this embodiment.

As shown in FIG. 1, the analysis system 1 is provided with an X-ray fluorescence analysis device (hereinafter simply referred to as "analysis device") and an information processing apparatus 90. The X-ray fluorescence analysis device 10 is a device for analyzing constituent elements of a sample by irradiating the surface of the sample with X-rays and detecting the fluorescence X-rays generated from the surface.

The information processing apparatus 90 is an apparatus to be connected to the X-ray fluorescence analysis device 10. In this example, the information processing apparatus 90 is a laptop computer, but it can be a desktop computer or a tablet terminal.

The X-ray fluorescence analysis device 10 is provided with a measurement device 20, sample trays 30 (sample trays 30a-30d), a mounting unit 31, mounting unit sensors 32, locking devices 33 (locking units 33a-33d), a retraction portion 60, and a controller 80.

The measurement device 20 is an energy dispersive ("Energy Dispersive X-ray Fluorescence Spectrometer; EDX) X-ray fluorescence analysis device for measuring the concentration of elements contained in a sample. The measurement device 20 irradiates the sample with X-rays and measures the concentration of elements contained in the sample according to the instructions from the controller 80. The measurement device 20 is composed of a sample chamber 106 and a measurement chamber 114. The measurement device 20 is covered with a housing and an opening/closing lid to form a sealed space inside. The measurement device 20 measures samples in a plurality of sample containers 40 for each sample container 40.

The sample trays 30 (sample trays 30a-30d) are user-removable trays and are provided outside the measurement device 20. One or more sample trays 30 are provided in the X-ray fluorescence analysis device 10. In this example, four sample trays 30, i.e., a sample tray 30a, a sample tray 30b, a sample tray 30c, and a sample tray 30d, are provided in the X-ray fluorescence analysis device 10. A plurality of sample containers 40 are placed on each of the sample trays 30. In this example, up to twelve (12) sample containers can be placed on each sample tray 30.

The sample container 40 is a container for accommodating a sample, and, for example, a milky-white container with a transparent film provided on the analysis surface to be exposed to X-rays. The top of the sample container 40 is open, and the inside of the sample container 40 is an unsealed space. The sample container 40 can accommodate a wide variety of samples and can accommodate solid samples as well as powder samples and liquid samples.

The sample tray 30 is placed on the mounting unit 31 provided outside the measurement device 20. When placing the sample containers 40 on the sample tray 30, the user pulls out the sample tray 30 from the mounting unit 31, places the sample containers 40 on the sample tray 30, and then inserts the sample tray 30 into the mounting unit 31. The mounting unit 31 is provided with a mounting unit sensor 32 (first sensor). The mounting unit sensor 32 is configured to detect that the sample tray 30 is set to the mounting unit 31. The mounting unit sensor 32 is provided at each position where the sample tray 30 is set so that it can detect at which position the sample tray 30 is set to the mounting unit 31. The mounting unit sensor 32 transmits the detection result to the controller 80. Specifically, in the case where a sample tray 30 has been set to the mounting unit 31, the mounting unit sensor 32 transmits to the controller 80 the fact that the sample tray 30 has been set to the mounting unit 31 and the identifier of the sample tray 30 set to the mounting unit 31. In the case where a sample tray 30 has not been set to the mounting unit 31, the mounting unit sensor 32 transmits to the controller 80 the fact that the sample tray 30 has not been set to the mounting unit 31. This allows the controller 80 to identify the sample tray 30 set to the mounting unit 31.

The conveyance device 50 selects one sample container 40 (hereinafter also referred to as "target container") from the plurality of sample containers 40 placed on the sample tray 30 and conveys the selected sample container 40 to the measurement device 20 according to the instruction from the controller 80. The conveyance device 50 includes an arm 51, four claws 52 (corresponding to the "gripping portion"), and a driving source (such as a motor) for the arm 51. The arm 51 is driven in the X-axis direction, the Y-axis direction, and the Z-axis direction by the driving source. The X-axis direction denotes an arbitrary direction in the horizontal direction, and the Y-axis direction denotes a direction orthogonal to the X-axis direction. Further, the Z-axis direction denotes a direction orthogonal to the X-axis direction and the Y-axis direction, and is a vertical direction. The claws 52 are provided on the tip end portion 53 of the arm 51 to grip the sample container 40. The claws 52 are pushed outward by the contact with the sample container 40. The claws 52 grip the sample container 40 in response to being pushed outward. The conveyance device 50 grips one target container with the claws 52 and conveys the target container from the sample tray 30 to the measurement device 20. Upon completion of the measurement of the sample in the target container, the conveyance device 50 conveys the target container from the measurement device 20 to the original sample tray 30 or the retraction portion 60. Specifically, in a case where the target container can be returned to its original position in the original sample tray 30, the conveyance device 50 returns the target container to its original position on the original sample tray 30. In a case where the target container cannot be returned to its original position of the original sample tray 30, the conveyance device 50 conveys the target container to the retraction portion 60. Note that, in this example, although four claws 52 are provided, the number of claws 52 is not limited to four as long as the number of claws 52 is sufficient to grip the sample container 40.

The sample container 40 is temporarily placed on the retraction portion 60. The retraction portion 60 is provided at a position different from the positions of the measurement device 20 and the sample trays 30. The retraction portion 60 is not composed of a housing and an opening/closing lid like the measurement device 20 and does not form a sealed space. In the case where the target container cannot be returned to the original sample tray 30 from the measurement device 20 after the measurement of the sample in the target container, the retraction portion 60 is used as a temporary storage place for the sample container 40. There are two cases in which the target container cannot be returned from the measurement device 20 to the original sample tray 30. The first case is a case in which the original sample tray 30 on which the target container was originally placed is not set to the mounting unit 31. The second case is a case in which the original sample tray 30 is set to the mounting unit 31, but another sample container is placed on the original position where the target container was originally placed. Whether the original sample tray 30 has been set to the mounting unit 31 is determined based on the detection result by the mounting unit sensor 32. Whether another sample container has been placed at the original position is determined based on the state of the claws 52 (e.g., the opening state of the claws 52) caused by the operation of gripping the sample container 40 made by the conveyance device 50 at the original position.

In the case of conveying the sample container 40, the controller 80 performs the following controls. First, the controller 80 moves the arm 51 so that the tip end portion 53 of the arm 51 is positioned above the sample container 40 as a conveyance target. When the tip end portion 53 of the arm 51 has reached above the target sample container 40 to be conveyed, the controller 80 makes the arm 51 descend to allow the claws 52 to grip the sample container 40. Then, the controller 80 makes the arm 51 raise to a predetermined position. When the arm 51 has been raised to the predetermined position, the controller 80 makes the arm 51 move so that the tip end portion 53 of the arm 51 is positioned above the conveyance destination of the sample container 40. When the tip end portion 53 of the arm 51 has reached above the target sample container 40 to be conveyed, the controller 80 makes the arm 51 descend to allow the claws 52 to grip the sample container 40. When the bottom of the sample container 40 has reached the conveyance destination, the controller 80 makes the claws 52 release the sample container 40.

The locking devices 33 (locking devices 33a-33d) lock the sample trays 30 to the mounting units 31 at positions where none of the plurality of sample containers 40 on the sample tray 30 can be replaced or no additional sample container 40 can be added on the sample tray 30. The locking devices 33 include four locking devices 33a-33d. The locking devices 33a-33d are provided on the mounting unit 31. The locking device 33a locks the sample tray 30a in place. The locking device 33b locks the sample tray 30b in place. The locking device 33c locks the sample tray 30c in place. The locking device 33d locks the sample tray 30d in place. For example, the locking device 33a inserts a part thereof into the sample tray 30a to lock the sample tray 30a to the mounting unit 31. With this, the sample tray 30a is locked in place and cannot be pulled out. When a part of the inserted sample tray 30a is pulled out from the locking device 33a, the sample tray 30a is unlocked. This allows sample tray 30a to be pulled out.

FIG. 1 shows the inside of the X-ray fluorescence analysis device 10. In fact, the portion shown by the dotted line is covered by a cover. Therefore, in the state in which the sample tray 30 is placed on the mounting unit 31, it is configured such that the sample container 40 cannot be replaced.

FIG. 2 shows a state in which the sample tray 30d of the analysis system 1 has been pulled out. As shown in FIG. 2, the sample containers 40 cannot be replaced for the sample trays 30a-30c placed on the mounting unit 31. On the other hand, the locking state of the locking device 33d has been released for the sample tray 30d. For this reason, the sample tray 30d can be pulled out as shown in the figure, and the sample containers 40 can be replaced in this state. Hereafter, it will be returned to the description of FIG. 1.

The locking device 33 locks the sample tray 30 in place during the consecutive measurement period. The "consecutive measurement period" is an operation period from the start of the measurement operation on the sample tray 30 to be measured to the end of the measurement operation in order to measure the samples in the plurality of sample containers 40. Further, the series of operations performed during the consecutive measurement period is also referred to as "consecutive operation." In other words, the consecutive measurement period is from the start of the consecutive operation until the end of the consecutive operation.

For example, in the case of measuring samples in six sample containers using the sample tray 30a, the consecutive measurement period is a period from the time when the conveyance device 50 starts its measurement operation to measure the sample in the first sample container until the time when the measurement of the sample in the sixth sample container is completed and the conveyance device 50 returns the sixth sample container to the sample tray 30*a*. During this time, the sample trays 30*a* and 30*b* are locked in place. The sample trays 30*a* and the sample tray 30*b* are provided as a set, and both of them will be locked in place when one of them starts the consecutive operation. The sample trays 30*c* and the sample tray 30*d* are provided as a set, and both of them will be locked in place when one of them starts the consecutive operation. Note that not limited to this, the sample trays 30*a*-30*d* may be locked in place independently.

The information processing apparatus 90 is responsible for managing the users using the X-ray fluorescence analysis device 10, managing the order (measurement schedule) of measuring the samples in the sample container 40, and determining whether to unlock the sample tray 30. For example, during the period in which the user A is performing consecutive measurements using the sample trays 30*a* and 30*b*, the user B, who does not have the unlocking authority, is not allowed to unlock the sample trays 30*a* and 30*b*. The storage unit 95 of the information processing apparatus 90 stores, for each user, the set value for the authority to unlock the sample tray 30 during the consecutive measurement period. The processing contents of the information processing apparatus 90 will be detailed with reference to FIG. 5 to FIG. 9.

FIG. 3 is a diagram showing the control configuration of the analysis system 1. As shown in FIG. 3, the X-ray fluorescence analysis device 10 is provided with a controller 80, a measurement device 20, a mounting unit sensor 32, a conveyance device 50, and locking devices 33*a*-33*d*.

The controller 80 includes a CPU (Central Processing Unit) 81, a ROM (Read Only Memory) 82, a RAM (Random Access Memory) 83, a communication interface 84, a storage unit 85, and an I/O (Input/Output) interface 86.

The CPU 81 comprehensively controls the entire X-ray fluorescence analysis device 10. The CPU 81 expands the program stored in the ROM 82 on the RAM 83 to execute the program. The ROM 82 stores a program in which the processing procedures of the controller 80 are described. The RAM 83 serves as a work region when the CPU 81 executes a program and temporarily stores the program and data for executing the program.

The communication interface 84 is an interface for communicating with the information processing apparatus 90. The storage unit 85 is a nonvolatile storage device for storing measurement results, etc., by the X-ray fluorescence analysis device 10. The storage unit 85 may be, for example, an HDD (Hard Disk Drive). The I/O interface 86 is an interface for an input to or an output from the controller 80. The I/O interface 86 is connected to the measurement device 20, the mounting unit sensor 32, the conveyance device 50, and the locking devices 33*a*-33*d*.

The information processing apparatus 90 includes a CPU 91, a ROM 92, a RAM 93, a communication interface 94, a storage unit 95, an input unit 96, and a display unit 97.

The CPU 91 comprehensively controls the entire information processing apparatus 90. The CPU 91 expands the program stored in the ROM 92 on the RAM 93 to execute the program. The ROM 92 stores a program in which the processing procedures of the information processing apparatus 90 are described. The RAM 93 serves as a work region when the CPU 91 executes the program and temporarily stores the program and data for executing the program.

The communication interface 94 is an interface for communicating with the X-ray fluorescence analysis device 10. The storage unit 85 is a nonvolatile storage device for storing, e.g., user management information.

The input unit 96 receives inputs including instructions for the information processing apparatus 90 from the user. The input unit 96 is, for example, a keyboard, a mouse, or a touch panel. The display unit 97 displays various images. The display device 75 displays, for example, the user's management screen.

[Measurement Device 20]

Next, referring to FIG. 4, the detailed configuration of the measurement device 20 and the measurement of samples by the measurement device 20 will be described. FIG. 4 is a diagram showing a configuration example of the measurement device 20.

The measurement device 20 includes housings 102 and 112 and a sample stage 104. The housing 102 is mounted on the upper surface of the sample stage 104, and the housing 102 and the sample stage 104 form a sample chamber 106. The housing 112 is attached to the lower surface of the sample stage 104, and the housing 112 and the sample stage 104 form a measurement chamber 114. The space formed by the sample chamber 106 and the measurement chamber 114 is hermetically enclosed by the housings 102 and 112, and the sample chamber 106 and the measurement chamber 114 are communicated by a connecting passage 110 formed in the sample stage 104.

The sample stage 104 has an opening 108, and a sample container 40 is placed on the sample stage 104 to cover the opening 108. At the time of the measurement, the sample container 40 is placed on the sample stage 104 so that the measurement position of the sample in the sample container 40 is exposed to the measurement chamber 114 at the opening 108. Above the opening 108 on which the sample container 40 is placed, an opening 22 is formed in the housing 102, and an opening/closing lid 24 is provided on the opening 22. The opening/closing lid 24 is in an open state when the sample container 40 is carried into and out of the sample chamber 106, and the opening/closing lid 24 is in a closed state at the time of measurement. The opening/closing lid 24 is configured to maintain the airtightness of the sample chamber 106 and the measurement chamber 114 in the closed state.

The measurement chamber 114 is provided with an X-ray tube 116 and a detector 126 on the housing 112. The X-ray tube 116 emits primary X-rays toward the lower surface (analysis surface) of the sample container 40. The X-ray tube 116 is configured to include a filament and a target and generate X-rays from the target by accelerating the hot electrons generated from the filament with high voltage and making them collide with the target. The primary X-rays emitted by the X-ray tube 116 are emitted via the opening 108 to the measurement position of the sample in the sample container 40.

When the sample in the sample container 40 is irradiated with X-rays from the X-ray tube 116, fluorescence X-rays are generated from the sample due to the photoelectric effect. Since fluorescent X-rays have specific energy for each element, a qualitative analysis of the elements contained in the sample can be performed by detecting the energy of the fluorescent X-rays with the detector 126, and a quantitative analysis of the elements contained in the sample can be performed by measuring the intensity of the fluorescent X-rays. The detector 126 is configured by a semiconductor detector containing, for example, a Si (Li) element.

The measurement chamber 114 is provided with a shutter 118, a primary X-ray filter 120, and a collimator 122. The shutter 118, the primary X-ray filter 120, and the collimator 122 are configured in a slidable manner in a direction perpendicular to the optical path of the primary X-rays by means of a drive mechanism 124.

The shutter 118 is made of an X-ray absorbing material, such as lead, which can be inserted into the primary X-ray path to shield the primary X-rays when necessary. The primary X-ray filter 120 is made of a purpose-selected metal foil that attenuates the background components of the primary X-rays emitted from the X-ray tube 116 to improve the S/N ratio of the required characteristic X-rays. Note that in the actual device, a plurality of primary X-ray filters 120 made of metals different from each other is used, and the primary X-ray filter 120 selected according to the purpose is inserted into the optical path of the primary X-ray by the drive mechanism 124.

The collimator 122 is an aperture with a circular opening in the center that determines the size of the beam of the primary X-rays to be emitted to the sample. The collimator 122 is made of an X-ray absorbing material, such as lead and brass. In the actual device, a plurality of collimators 122 with mutually different opening diameters is arranged in a direction perpendicular to the optical path of the primary X-rays, and the collimator 122 selected according to the purpose is inserted into the optical path of the primary X-rays by the drive mechanism 124.

The exhaust device 130 is a device for exhausting the atmosphere in the sample chamber 106 and the measurement chamber 114 and is configured to include, for example, an exhaust pump, an open/close valve, a pressure control valve, and a pressure gauge. The exhaust device 130 is controlled by the controller 80 according to the analysis parameters and can exhaust the air in the chamber through the vent 128 and the switching valve 134 to create a vacuum atmosphere (e.g., 30 Pa or less) in the chamber.

The charging device 132 is a device for supplying air or helium gas into the sample chamber 106 and the measurement chamber 114 and is configured to include, for example, an air supply pump, an open/close valve, a pressure gauge, and the like. The charging device 132 is controlled by the controller 80 according to the analysis parameters. In a case where the chamber is a vacuum atmosphere when an atmospheric atmosphere is set, the charging device 132 supplies air to the chamber through the switching valve 134 and the vent 128. Further, when a helium atmosphere is set, the charging device 132 supplies a helium atmosphere to the chamber through the switching valve 134 and the vent 128.

The switching valve 134 is controlled by the controller 80. At the time of exhaust by the exhaust device 130, the switching valve 134 connects the exhaust device 130 to the vent 128 and shuts off the inflow of gas from the charging device 132. Further, at the time of air supply by the charging device 132, the switching valve 134 connects the charging device 132 to the vent 128 and shuts off gas exhaust to the exhaust device 130.

Note that in this example, the vent 128 is provided around the detector 126, but the configuration of the vent 128 is not limited thereto.

In the case of measuring the sample, the controller 80 performs the following controls. First, the controller 80 controls the atmosphere in the measurement chamber of the measurement device 20 according to the analysis parameters of the target container. The analysis parameters are set by the user using the input device 70 for each sample container 40 placed on the sample tray 30 (see FIG. 1). Specifically, the controller 80 controls the state of the atmosphere in the measurement chamber 114 to be any one of an atmospheric atmosphere, a vacuum atmosphere, and a helium atmosphere, according to the analysis parameters.

When the atmosphere in the measurement chamber 114 is adjusted, the controller 80 makes the measurement device 20 initiate the measurement according to the analysis parameters of the target container. Specifically, the controller 80 controls the tube voltage, the tube current, and the irradiation time of the X-ray tube 116, and drives the shutter 118, the primary X-ray filter 120, and the collimator 122, according to the analysis parameters.

Next, the controller 80 performs the analyses (qualitative analysis and quantitative analysis) of various elements contained in the sample in the target container, based on the spectrum of secondary X-rays (fluorescence X-rays) detected by the detector 126, and stores the analysis results in the storage unit 85.

[Example of Registered User Information and Unlocking Authority]

FIG. 5 is a diagram showing an example of registered user information and unlocking authority. As shown in FIG. 5, the user information includes a belonging group and a user name. The releasing authority (also referred to as "unlocking authority") includes unlocking authority for all users (also referred to as "administrator authority"), unlocking authority for groups (also referred to as "group authority"), and unlocking authority for users (also referred to as "user authority").

The storage unit 95 stores, for each user, set values for the authority to unlock the sample trays 30 during the consecutive measurement period (during consecutive measurements). For example, the presence or absence of the administrator authority, the group authority, and the user authority may be stored in the storage unit 95 as set values. For example, in a case where the user has authority, "0xFF" is stored as the set value, and in a case where the user does not have authority, "0x00" is stored as the set value. Other than the above, for example, only any one of the administrator authority, the group authority, and the user authority may be held. In this case, as the set value, "3" may be stored when it has the administrator authority, "2" may be stored when it has the group authority, "1" may be stored when it has the user authority, and "0" may be stored when it has no authority. Alternatively, as the unlocking authority, only whether it has the administrator authority may be stored as a set value.

In the case where the unlocking authority (administrator authority) has been granted to all users, even if the sample tray 30 used by any user is locked during the consecutive measurement period (during the consecutive measurement), when the user who is granted this unlocking authority requests the unlocking of the sample tray 30, the sample tray 30 may be unlocked.

In the case where the unlocking authority (group authority) is granted to the group to which the user belongs, when the sample tray 30 used by a user belonging to the group to which the user belongs is locked during the consecutive measurement period, when the user who is granted this unlocking authority requests to unlock the sample tray 30, the sample tray 30 can be unlocked. In a case where a user other than a user belonging to the group to which he/she belongs is using the sample tray 30, the sample tray 30 cannot be unlocked.

In the case where the unlocking authority (administrator authority) is granted to a user, when the user requests the unlocking of the sample tray 30 in a state in which the sample tray 30 used by the user is locked during the consecutive measurement period, the sample tray 30 can be unlocked. In the case where another user is using the sample tray 30, the sample tray 30 cannot be unlocked. In the case where no unlocking authority (user authority) is granted to the user, the user cannot unlock the sample tray 30 even by the user itself.

In this example, there are groups X, A, B, and C as belonging groups. To Group X, the user X1 belongs. To Group A, the users A1 to A3 belong. To Group B, the users B1 to B3 belong. To Group C, the users C1 to C4 belong.

For example, the user X1 is granted all of the administrator authority, the group authority, and the user authority. Therefore, the user X1 can unlock the sample tray 30 even if the sample tray 30 is being used by any user. The same is true for the users A1, B1, and C1.

The user A2 is granted both the group authority and the user authority. Therefore, the user A2 can unlock the sample tray 30 even in the case where the sample tray 30 is being used by any one of the users A1 to A3 of the group A to which the user A2 belongs.

The user A3 is granted only the user authority. Therefore, the user A3 can unlock the sample tray 30 in a case where the user A3 is using the sample tray 30.

The user C4 is granted none of authorities. Therefore, the user C4 cannot unlock the sample tray 30 even in the case where the sample tray 30 is being used by any user including the user C4 itself.

[Example of Measurement Schedule Screen]

The information processing apparatus 90 registers the order of measuring the samples in the plurality of sample containers 40 placed on the sample tray 30 and the user using the sample tray 30. The X-ray fluorescence analysis device 10 selects the sample tray 30 to be used by the registered user and performs the measurements of the samples in the order of registration.

FIG. 6 is a diagram showing an example of a measurement schedule screen. The user can register the measurements (measurement schedule) of samples on the measurement schedule screen. As shown in FIG. 6, a list of the registered measurement schedules is displayed.

The measurement schedule screen displays "Measurement Order (No.)," "Consecutive Measurement," "User Name," "Sample Tray Name," "Sample No. (Sample Name)," "Execution State," and "Locking State." In the following description, the "sample tray 30a" may be referred to as a "sample tray 1A," the "sample tray 30b" as a "sample tray 1B," the "sample tray 30c" as a "sample tray 2A," and the "sample tray 30d" as a "sample tray 2B."

Here, the sample trays 30a-30d each can set twelve (12) sample containers 40. The places where the twelve sample containers 40 are set are each assigned by the sample No. For example, the left-hand column of the sample tray is assigned by the sample Nos. 1-6, starting from the back, and the right-hand column of the sample tray is assigned by the sample Nos. 7-12, starting from the back.

In this example, the measurements of samples Nos. 1-19 are registered as the order of measurement. Here, "Consecutive Measurement" displays the set of consecutive measurements to be performed. Measurement 1 of Nos. 1-6 will be executed as the first consecutive measurement. When this consecutive measurement is completed, the consecutive measurement 2 of Nos. 7 to 19 will be executed as the second consecutive measurement.

The consecutive measurement 1 is a consecutive measurement performed by the user A1 using the sample tray

1A. The consecutive measurement 2 is a consecutive measurement performed by the user B3 using the sample trays 2A and 2B.

In the consecutive measurement 1, the samples X1 to X6 are set at the positions of the samples Nos. 1 to 6 in the sample tray 1A, and the measurements are performed in the order of the samples Nos. 1 to 6. In the consecutive measurement 2, the samples Nos. 1 to 8 (samples Y1 to Y8) in the sample tray 2A are measured consecutively, and then the samples Nos. 1 to 5 (samples Z1 to Z5) in the sample tray 2B are measured consecutively.

Currently, the measurements of the samples Nos. 1-3 have been completed, and the measurement of the sample No. 4 is currently being performed. The measurements of the samples Nos. 5 to 19 have not been performed and are in the standby state. Further, since the continuous measurement 1 is being executed, the sample tray 1A and the sample tray 1B used by the user A1 who measures the samples Nos. 1 to 6 are locked. On the other hand, the sample trays 2A and 2B are not locked.

Here, the user A1 is granted the administrator authority. Therefore, even if the sample tray 1A used by the user A1 is locked, or the sample tray 2A used by the user B3 is locked, both the sample trays can be unlocked.

The user B3 is granted only the user authority. Therefore, the sample trays 1A and 1B cannot be unlocked if the sample tray 1A used by the user A1 is locked. However, since the sample trays 2A and 2B are not being used at this time, the sample trays 2A and 2B can be pulled out freely. When the sample tray 2A used by the user B3 is locked, this sample tray can be unlocked.

[Flowchart of Measurement Registration Processing]

FIG. 7 is a flowchart showing measurement registration processing. The processing shown in FIG. 7 is processing performed by the information processing apparatus 90 and is realized by the CPU 91 executing a program stored in the ROM 92.

As described with reference to FIG. 6, the user can register a measurement schedule. The registration of the measurement schedule is performed on the registration screen (not shown). The user inputs a pre-assigned user name and password to log in and open the registration screen. On the registration screen, the user inputs the order of the sample Nos. (sample names) to be measured along with the name of the sample trays to be used. When inputs are completed and the registration button is clicked, the measurement registration processing is initiated. Hereinafter, "Step" will be referred to simply as "S."

When the measurement registration processing is initiated, the CPU 91 acquires the logged-in user name, the sample tray name input on the registration screen, and the order of samples to be measured (S11). For example, in the example in FIG. 6, in the case of registering Nos. 1-6, the user logged in to perform the registration is the user A1. The user A1 inputs "Tray 1A" as the sample tray to be used, and inputs, as the order of samples to be measured, Sample No. 1 (Sample X1), Sample No. 2 (Sample X2), Sample No. 3 (Sample X3), Sample No. 4 (Sample X4), Sample No. 5 (Sample X5), and Sample No. 6 (Sample X6), in this order.

Next, the CPU 91 sets the consecutive measurement information in S12 and advances the processing to S13. In the above example, the measurements of Samples Nos. 1 to 6 (Samples X1 to X6) performed by the user A1 using the sample tray 1A are a series of consecutive measurements, and therefore, these measurements of Samples Nos. 1 to 6 (Samples X1 to X6) are set as continuous measurements ("Continuous Measurement No. 1").

In S13, the CPU 91 acquires the user's unlocking authority information and advances the processing to S14. In the above example, the unlocking authority of the user A1 is retrieved from the storage unit 95. The unlocking authority of the user A1 is stored in the storage unit 95 as "with administrator authority, with group authority, and with user authority." (see FIG. 5)

In S14, the CPU 91 registers "Execution No.," "Consecutive Measurement Information," "User Name," "Sample Tray Name," "Sample No. (sample name)," and "Unlocking Authority Information," and then terminates the measurement registration processing. In the above example, for "Execution No."="1-6", "Consecutive Measurement No."="1," "User Name"="User A1," "Sample Tray Name"="Sample Tray 1A," "Sample No. (Sample Name)"="Samples Nos. 1-6 (Samples X1-X6)" and "Unlocking Authority Information"="with Administrator Authority, with Group Authority, with User Authority" are stored (registered) in the storage unit 95.

[Flowchart of Unlocking Determination Processing (Information Processing Apparatus Side)]

FIG. 8 is a flowchart showing unlocking determination processing (information processing apparatus side). The processing shown in FIG. 8 is processing performed by the information processing apparatus 90 and is realized by the CPU 91 executing a program stored in the ROM 92.

The locking device 33 locks the sample trays 30 (sample trays 1A, 1B, 2A, 2B) during the consecutive measurement period (during continuous measurements). During this consecutive measurement, the unlocking determination processing (information processing apparatus side) is executed. Hereinafter, "Step" is referred to simply as "S."

Upon initiating the unlocking determination processing (information processing apparatus side), the CPU 91 determines whether there is an unlocking request (S21). In the case where it is determined that there is an unlocking request (YES in S21), the processing proceeds to S22, and in the case where it is determined that there is no unlocking request (NO in S21), the processing in S21 is repeated.

Specifically, the user can make the unlocking request of the locked sample tray 30 on the information processing apparatus 90. For example, in the example in FIG. 6, in the state in which the user A1 is measuring the sample 4 using the sample tray 1A, the user B3 makes a request on the information processing apparatus 90 to unlock the sample trays 1A and 1B.

The CPU 91 acquires the user's name, the sample tray name, and the unlocking authority information of the user who made the request for the unlocking in S22, and advances the processing to S23. In the above example, the user who made the unlocking request is the user B3, and the name of the sample tray is the sample tray 1A. The unlocking authority information for the user B3 is "Without Administrator Authority, Without Group Authority, With User Authority".

Next, the CPU 91 determines whether there is unlocking authority for the sample tray under consecutive measurements (S23). In the case where the CPU 91 determines that there is an unlocking authority for the sample tray under consecutive measurements (YES in S23), it advances the processing to S24. In the case where the CPU 91 determines that there is unlocking authority for the sample tray under consecutive measurements (YES in S23), it terminates the unlocking determination processing (information processing apparatus side).

In the above example, it is determined whether the user B3 has unlocking authority for the sample tray 1A used by the user A1 during the consecutive measurements. The user B3 has only the user authority. Therefore, the user B3 does not have the unlocking authority for the sample tray 1A used by user A1, which is different from the user B3.

In S24, the CPU 91 issues the unlocking command and terminates the unlocking determination processing (information processing apparatus side). In the above example, for example, when the user X1 with the administrator authority makes an unlocking request for the sample tray 1A used by the user A1 during the consecutive measurements, an unlocking command is issued.

The unlocking command is issued by transmitting the communication command from the information processing apparatus 90 to the analysis device 10. The information processing apparatus 90 and the analysis device 10 can communicate with each other, and when the unlocking command is issued by the information processing apparatus 90, a communication command that can identify the fact that the unlocking command was issued is transmitted to the analysis device 10.

[Flowchart of Unlocking Determination Processing (Analysis Device Side)].

Figure 9:
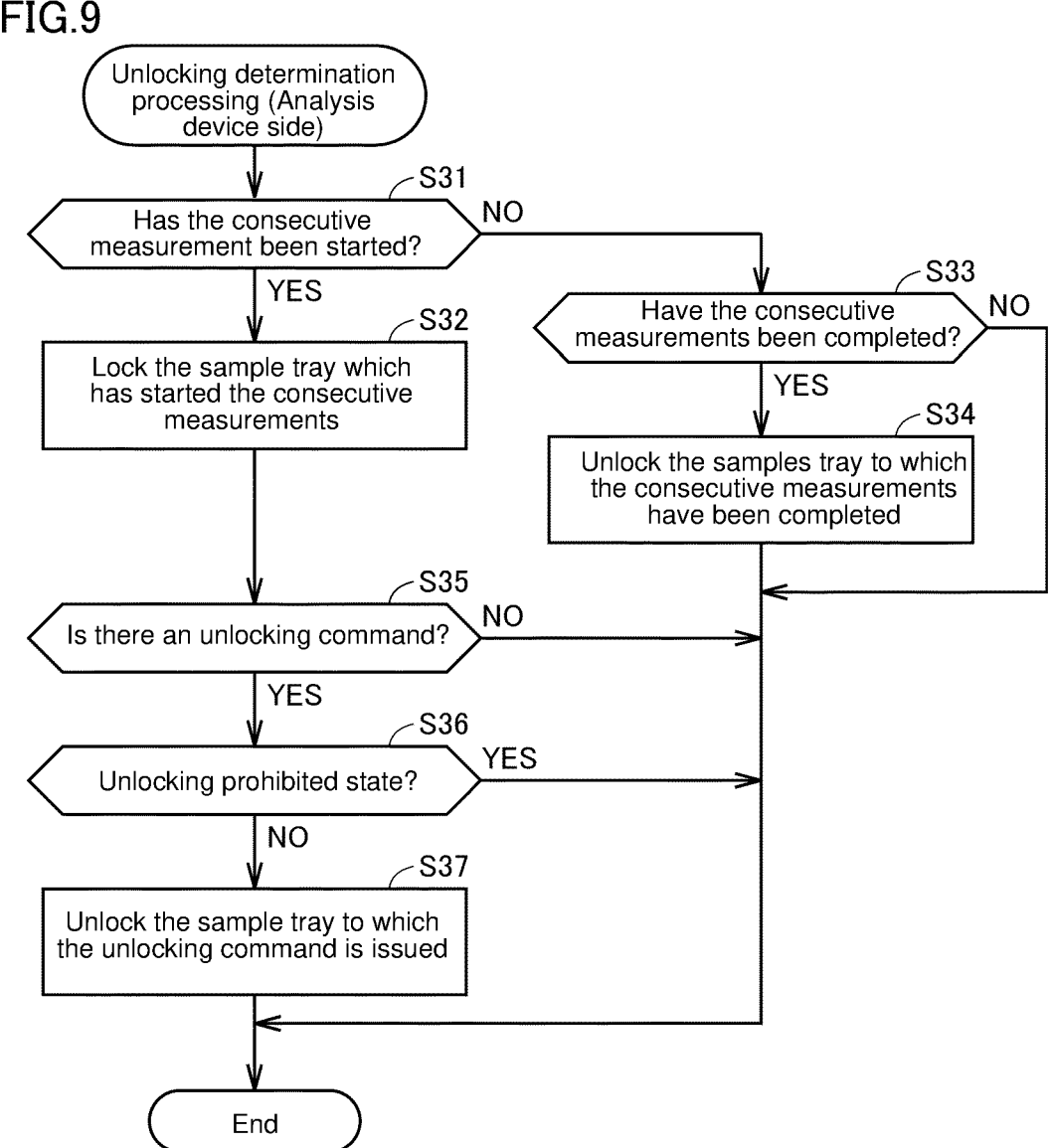
FIG. 9 is a flowchart showing unlocking determination processing (analysis device side).

FIG. 9 is a flowchart showing unlocking determination processing (analysis device side). The processing shown in FIG. 9 is the processing performed by the information processing apparatus 90 and is realized by the CPU 81 executing a program stored in the ROM 82.

The unlocking determination processing (analysis device side) is, for example, processing that is initiated at each timer interrupt cycle. Hereinafter, "Step" is referred to simply as "S."

After initiating the measurement registration processing, the CPU 81 determines whether consecutive measurements have been initiated (S31). In the case where the CPU 81 determines that the consecutive measurements have been initiated (YES in S31), it advances the processing to S32. In the case where the CPU 81 determines that no consecutive measurements have been initiated (NO in S31), it advances the processing to S33. In S32, the CPU 81 locks the sample tray which has started the consecutive measurements and advances the processing to S35.

In S33, the CPU 81 determines whether the consecutive measurements have been completed. In the case where the CPU 81 has determined that the consecutive measurements have been completed (YES in S33), it advances the processing to S34. In the case where the CPU 81 has determined that no consecutive measurements have been completed (NO in S33), the unlocking determination processing (analysis device side) is terminated. In S34, the CPU 81 unlocks the sample tray that has completed the consecutive measurements and the processing is terminated.

As described above, when consecutive measurements are initiated, the sample trays subject to the consecutive measurements are locked in place, and when the consecutive measurements are completed, the sample trays subject to the consecutive measurements are unlocked. Whether it is possible to perform the unlocking during consecutive measurements is determined as follows.

In S35, the CPU 81 determines whether there is an unlocking command. When the CPU 81 has determined that there is an unlocking command (YES in S35), it advances the processing to S36. When the CPU 81 has determined that there was no unlocking command (NO in S35), the unlocking determination processing (analysis device side) is terminated.

In the case where the unlocking command is issued in S24 of the unlocking determination processing (information processing apparatus side) as described with reference to FIG. 8, a communication command which can identify the unlocking command is transmitted from the information processing apparatus 90 to the analysis device 10. When the analysis device 10 receives this communication command, it determines that there is an unlocking command.

In S36, the CPU 81 determines whether it is in an unlocking prohibited state. When the CPU 81 determines that it is in the unlocking prohibited state (YES in S36), it terminates the unlocking determination processing (analysis device side). When the CPU 81 determines that it is not in the unlocking prohibited state (NO in S36), it advances the processing to S37.

The information processing apparatus 90 determines that it is in the unlocking prohibited state during which the conveyance device 50 is performing an operation to take out one of the plurality of sample containers 40 from the sample tray 30 or an operation to return one of the plurality of sample containers 40 to the sample tray 30. When it is determined that it is in the unlocking prohibited state, the information processing apparatus 90 does not unlock the sample tray 30 (i.e., it prohibits the unlocking).

In S37, the CPU 81 unlocks the sample tray 30 to which the unlocking command was issued and terminates the unlocking determination processing (analysis device side).

In the example described with reference to FIG. 7, the sample trays 1A and 1B used by the user A1, which are under consecutive measurements, are locked. The sample trays 2A and 2B, which are not under consecutive measurements, are not locked in place. When the user A1 using the sample trays 1A and 1B issues an unlocking request, the locking is released. When the user X1 having the administrator authority issues an unlocking request for the sample trays 1A and 1B, the locking will be released.

When the user C3 having only the user authority for the sample trays 1A and 1B issues an unlocking request, the locking will not be released. However, the sample trays 2A and 2B that are not under consecutive measurements are not locked in place, so the user C3 can pull out the sample trays 2A and 2B to replace the samples.

As described above, the information processing apparatus 90 determines whether to unlock the sample tray 30 during the consecutive measurement period, based on the set values of the unlocking authority (set values of the administrator authority, the group authority, and the user authority). The locking device 33 unlocks the sample tray 30 during the consecutive measurement period based on the determination (unlocking command) of the information processing apparatus 90.

Further, in the case where the sample tray 30 used by the first user is locked during the consecutive measurement period, when the first user requests to unlock the sample tray 30, the information processing apparatus 90 determines to unlock the sample tray 30, while when the second user requests to unlock the sample tray 30, the information processing apparatus 90 determines to unlock the sample tray 30 based on the set values of the unlocking authority (the set values of the administrator authority, the group authority, and the user authority).

Further, the locking device 33 locks the sample trays 1A and 1B during the consecutive measurement period from the start of the measurement operation for the sample trays 1A and 1B until the end of the measurement operation, while it does not lock the sample trays 2A and 2B that are not under the measurement operation.

In this manner, during the operation period from the start of the measurement operation on the sample tray 30 to the end of the measurement operation to measure the samples in the plurality of sample containers (during the consecutive measurement period), the sample tray 30 is locked to the mounting unit 31 at a position where none of the sample containers 40 on the sample tray 30 can be replaced. Therefore, the data integrity is ensured. In addition, the sample tray 30 is unlocked during the operation period based on the set value of the authority to unlock the sample tray 30 set for each user, and therefore, the sample container 40 can be replaced by unlocking for the user with the authorization. By configuring as described above, in the case of measuring a plurality of samples, it is possible for a plurality of users to perform the measurements suitably while maintaining the data integrity.

<Modifications>

In this embodiment, the X-ray fluorescence analysis device 10 as an analysis device is illustrated and described. However, the analysis device is not limited to the X-ray fluorescence analysis device 10, and any analysis device capable of analyzing samples may be used. Further, in this embodiment, the analysis system 1 is equipped with the X-ray fluorescence analysis device 10 and the information processing apparatus 90. However, it is not limited thereto, and the X-ray fluorescence analysis device 10 may be equipped with the functions provided by the information processing apparatus 90. In this case, the X-ray fluorescence analysis device 10 is provided with an input unit and a display unit to perform the user management as described above and to register and display the measurement schedules. Furthermore, the X-ray fluorescence analysis device 10 and the server device (PC) may be connected to each other, and furthermore, the client device (PC) may be connected to the server device. In this case, the server device may be used to perform the user management and the management of the measurement schedules, and the client device may be used to display and register the measurement schedules. Not limited to this, a part of the processing performed by the information processing apparatus 90 may be performed by the server device, and the remaining processing may be performed by the client device.

For example, even in the case where the sample tray 1A is being used and the consecutive measurements are in progress, an authorized user may interrupt this and have another consecutive measurement performed using the sample tray 1B. After the completion of another interrupted consecutive measurement, the consecutive measurements of the sample tray 1A that was interrupted may be resumed.

[Aspects]

It would be understood by those skilled in the art that the exemplary embodiments described above are specific examples of the following aspects.

(Item 1)

An analysis system according to one aspect of the present disclosure is provided with an analysis device and an information processing apparatus. The analysis device analyzes a sample. The information processing apparatus is connected to the analysis device. The analysis device includes sample trays, a measurement device, a mounting unit, and a locking device. The sample tray is one or more trays each configured to place a plurality of sample containers thereon. The measurement device is configured to measure samples in a plurality of sample containers for each sample container. A sample tray is placed on the mounting unit. A locking device is configured to lock the sample tray to the mounting unit at a position where none of the plurality of sample containers on the sample tray can be replaced. The locking device locks the sample tray during an operation period from a start of a measurement operation on the sample tray to measure the samples in the plurality of sample containers until an end of the measurement operation. The information processing apparatus includes a storage unit for storing, for each user, a set value for authorization to unlock the sample tray during the operation period. The information processing apparatus is configured to determine whether to unlock the sample tray during the operation period, based on the set value. The locking device unlocks the sample tray during the operation period, based on a determination of the information processing apparatus.

According to the analysis system as recited in the above-described Item 1, data integrity can be maintained because the sample tray is locked to the mounting unit in the position where none of the plurality of sample containers on the sample tray can be replaced during the operation period from the start of the measurement operation for the sample tray to the end of the measurement operation to measure the samples in the plurality of sample containers. In addition, the sample tray is unlocked during the operation period based on the set value of the authorization to unlock the sample tray set for each user, which allows for the user having the authorization to unlock the sample tray and replace the sample containers. By configuring as described above, in the case of measuring a plurality of samples, it is possible for a plurality of users to perform the measurement suitably while maintaining the data integrity.

(Item 2)

In the analysis system as recited in the above-described Item 1, in a case where the sample tray registered to be used by a first user is locked during the operation period, the information processing apparatus determines to unlock the sample tray when the first user requests unlocking of the sample tray, while the information processing apparatus determines to unlock the sample tray based on the set value when a second user requests unlocking of the sample tray.

In the analysis system as recited in the above-described Item 2, in the case where the sample tray used by the first user is locked during the operation period, when a second user requests unlocking of the sample tray, it is determined whether the sample tray is unlocked based on the set value. Therefore, it is possible for the plurality of users to perform measurements preferably while securing the data integrity.

(Item 3)

In the analysis system as recited in the above-described Item 1 or 2, the one or more sample trays include a first sample tray and a second sample tray, and the locking device locks the first sample tray during the operation period from a start of a measurement operation on the first sample tray to an end of the measurement, while the locking device does not lock the second sample tray which is not under the measurement operation.

According to the analysis system as recited in the above-described Item 3, the second sample tray that is not performing a measurement operation is not locked, which increases the degree of freedom to use the sample tray and allows a plurality of users to perform measurements suitably.

(Item 4)

In the analysis system as recited in the above-described Items 1 to 3, the analysis device is further provided with a conveyance device, the conveyance device being configured to convey a first sample container out of the plurality of sample containers placed on the sample tray to the measurement device and return the first sample container to the sample tray after the measurement by the measurement device.

According to the analysis system as recited in the above-described Item 4, it is provided with the conveyance device that conveys the first sample container out of the plurality of sample containers placed on the sample tray to the measurement device and returns the first sample container to the sample tray after measurement by the measurement device. Therefore, measurements of the plurality of samples can be performed more efficiently.

(Item 5)

In the analysis system as recited in the above-described Item 4, the information processing apparatus does not unlock the sample tray while the conveyance device is performing an operation of taking out one of the plurality of sample containers from the sample tray for conveyance or an operation of returning one of the plurality of sample containers to the sample tray.

According to the analysis system as recited in the above-described Item 5, it is possible to prevent inconveniences such as the falling of the sample container or the spilling of the sample by pulling out the sample tray when the operation of taking out one of the plurality of sample containers from the sample tray for transportation or returning one of the plurality of sample containers to the sample tray is being performed.

(Item 6)

In the analysis system as recited in any one of the above-described Items 1 to 5, the one or more sample trays include a plurality of sample trays, and the information processing apparatus registers an order of measuring the samples in the plurality of sample containers placed on the sample trays and a user who uses the sample trays. The analysis device selects the sample tray to be used by a registered user and performs the measurement of the sample in a registration order.

According to the analysis system as recited in the above-described Item 6, the measurement schedule for the plurality of samples performed by the plurality of users can be efficiently managed.

(Item 7)

In the analysis system as recited in any one of the above-described Items 1 to 6, the analysis device is an X-ray fluorescence analysis device configured to analyze a sample by irradiating a surface of the sample with X-rays and detecting fluorescence X-rays generated from the surface.

According to the analysis system as recited in the above-described Item 7, in the case of performing consecutive measurements of a plurality of samples in an X-ray fluorescence analysis device, the plurality of users can perform the measurements in a suitable manner while maintaining the data integrity.

(Item 8)

An analysis device according to an aspect analyzes a sample. The analysis device includes a sample tray, a measurement device, a mounting unit, and a locking device. The sample tray is one or more trays configured to place a plurality of sample containers thereon. The measurement device is configured to measure samples in a plurality of sample containers for each sample container. A sample tray is placed on the mounting unit. A locking device locks the sample tray to the mounting unit at a position where none of the plurality of sample containers on the sample tray can be replaced. The locking device is configured to lock the sample tray during an operation period from a start of a measurement operation on the sample tray to measure the sample in the plurality of sample containers until an end of the measurement operation. The analysis device is connected to the information processing apparatus. The information processing apparatus includes a storage unit for storing, for each user, a set value for the authorization to unlock the sample tray during the operation period. The information processing apparatus determines whether to unlock the sample tray during the operation period, based on the set value. The locking device is configured to unlock the sample tray during the operation period, based on the determination of the information processing apparatus.

According to the analysis device as recited in the above-described Item 8, data integrity can be maintained because the sample tray is locked to the mounting unit in the position where none of the plurality of sample containers on the sample tray can be replaced during the operation period from the start of the measurement operation for the sample trays to the end of the measurement operation to measure the samples in the plurality of sample containers. In addition, the sample tray is unlocked during the operation period based on the set value of the authorization to unlock the sample tray set for each user, which allows for the user having the authorization to unlock the sample tray and replace the sample containers. By configuring as described above, in the case of measuring a plurality of samples, it is possible for a plurality of users to perform the measurement suitably while maintaining data integrity.

(Item 9)

A control method according to one aspect of the present disclosure is a control method for an analysis system for analyzing a sample. The analysis system is provided with one or more sample trays each configured to place a plurality of sample containers thereon, a mounting unit configured to place the sample tray thereon, a measurement device configured to measure samples in the plurality of sample containers for each sample container, a locking device configured to lock the sample trays to the mounting unit at a position where none of the plurality of sample containers on the sample tray can be replaced, and a sample storage unit configured to store a set value for authority to unlock the tray for each user. The control method includes a step of locking the sample trays during an operation period from a start of a measurement operation on the sample trays to measure the samples in a plurality of sample containers to an end of the measurement operation; a step of determining whether to unlock the sample trays during the operation period, based on a set value; and a step of unlocking the sample tray during the operation period based on the determination of the determination step.

According to the control method as recited in the above-described Item 9, data integrity can be maintained because the sample tray is locked to the mounting unit in the position where none of the plurality of sample containers on the sample trays can be replaced during the operation period from the start of the measurement operation for the sample trays to the end of the measurement operation to measure the samples in the plurality of sample containers. In addition, the sample tray is unlocked during the operation period based on the set value of the authorization to unlock the sample tray set for each user, which allows for the user having the authorization to unlock the sample tray and replace the sample containers. By configuring as described above, in the case of measuring a plurality of samples, it is possible for a plurality of users to perform the measurement suitably while maintaining data integrity.

Note that the embodiments disclosed here should be considered illustrative and not restrictive in all respects. It should be noted that the scope of the present invention is indicated by claims and is intended to include all modifications within the meaning and scope of the claims and equivalents.

DESCRIPTION OF REFERENCE SYMBOLS

1 Analysis System, 10 X-ray fluorescence analysis device, 20 Measurement Device, 22, 108 opening, 24 Opening/closing lid, 30a, 30b, 30c, 30d Sample tray, 31 Mounting unit, 32 Mounting unit sensor, 33a, 33b, 33c, 33d Locking device, 40 Sample container, 50 Conveyance device, 51 Arm, 52 Claw, 53 Tip end portion, 60 Retraction portion, 80 Controller, 81 CPU, 82 ROM, 83 RAM, 84 Communication interface, 85 Storage unit, 86 I/O interface, 90 Information processing apparatus, 91 CPU, 92 ROM, 93 RAM, 94 Communication interface, 95 Storage unit, 96 Input unit, 97 Output unit, 102, 112 Housing, 104 Sample stage, 106 Sample chamber, 110 Connecting passage, 114 Measurement chamber, 116 X-ray tube, 118 Shutter, 120 Primary X-ray filter, 122 Collimator, 124 Drive mechanism, 126 Detector, 128 Vent, 130 Exhaust device, 132 Charging device, 134 Switching valve.

The invention claimed is:

1. An analysis system comprising:

an analysis device configured to analyze samples; and an information processing apparatus connected to the analysis device, wherein the analysis device includes:

a plurality of sample trays including a first sample tray, each sample tray being configured to place a plurality of sample containers thereon;

a mounting unit configured to place the plurality of sample trays thereon;

a measurement device configured to measure samples in the plurality of sample containers for each sample container; and a locking device configured to lock the first sample tray to the mounting unit at a position where none of the plurality of sample containers on the first sample tray can be replaced, wherein the locking device is configured to lock the first sample tray during an operation period from a start of a measurement operation on the first sample tray to measure the samples in the plurality of sample containers until an end of the measurement operation, wherein the information processing apparatus includes a storage unit for storing, for each user, a set value for authorization to unlock the first sample tray during the operation period and determines whether to unlock the first sample tray during the operation period, based on the set value, wherein the locking device is configured to unlock the first sample tray during the operation period, based on a determination of the information processing apparatus, wherein the information processing apparatus is configured to register an order of measuring the samples in the plurality of sample containers placed on the plurality of sample trays and a user who uses the plurality of sample trays, and wherein the analysis device is configured to select the first sample tray of the plurality of sample trays to be used by a registered user and to perform the measurement of the samples in a first registered order of the first sample tray as registered by the information processing apparatus.

2. The analysis system as recited in claim 1,
wherein in a case where the first sample tray registered to be used by a first user is locked during the operation period, the information processing apparatus determines to unlock the first sample tray when the first user requests unlocking of the first sample tray, while the information processing apparatus determines to unlock the first sample tray based on the set value when a second user requests unlocking of the first sample tray.

3. The analysis system as recited in claim 1,
wherein the plurality of sample trays include the first sample tray and a second sample tray, and
wherein during the operation period from the start of the measurement operation on the first sample tray to the end of the measurement operation, the locking device locks the first sample tray, while the locking device does not lock the second sample tray which is not under the measurement operation.

4. The analysis system as recited in claim 1,
wherein the analysis device is further provided with a conveyance device, the conveyance device being configured to convey a first sample container out of the plurality of sample containers placed on the first sample tray to the measurement device and return the first sample container to the first sample tray after the measurement by the measurement device.

5. The analysis system as recited in claim 4,
wherein the information processing apparatus does not unlock the first sample tray during which the conveyance device is performing an operation of taking out one of the plurality of sample containers from the first sample tray for conveyance or an operation of returning one of the plurality of sample containers to the first sample tray.

6. The analysis system as recited in claim 1,
wherein the analysis device is an X-ray fluorescence analysis device configured to analyze the samples by irradiating a corresponding surface of each of the samples with X-rays and detecting fluorescence X-rays generated from the surface.

7. An analysis device for analyzing a sample, comprising:
a plurality of sample trays including a first sample tray each sample tray being configured to place a plurality of sample containers thereon;
a mounting unit configured to place the plurality of sample trays thereon;
a measurement device configured to measure samples in the plurality of sample containers for each sample container; and
a locking device configured to lock the first sample tray to the mounting unit at a position where none of the plurality of sample containers on the first sample tray can be replaced,
wherein the locking device is configured to lock the first sample tray during an operation period from a start of a measurement operation on the first sample tray to measure the samples in the plurality of sample containers until an end of the measurement operation,
wherein the analysis device is configured to be connected to an information processing apparatus,
wherein the information processing apparatus includes a storage unit for storing, for each user, a set value for authorization to unlock the first sample tray during the operation period and determines whether to unlock the first sample tray during the operation period, based on the set value,
wherein the locking device is configured to unlock the first sample tray during the operation period, based on a determination of the information processing apparatus:
wherein the information processing apparatus is configured to register an order of measuring the samples in the plurality of sample containers placed on the plurality of sample trays and a user who uses the plurality of sample trays, and
wherein the analysis device is configured to select the first sample tray of the plurality of sample trays to be used by a registered user and to perform the measurement of the samples in a first registered order of the first sample tray as registered by the information processing apparatus.

8. A control method of an analysis system for analyzing a sample,
wherein the analysis system comprises:
a plurality of sample trays including a first sample tray, each sample tray being configured to place a plurality of sample containers thereon;
a mounting unit configured to place the plurality of sample trays thereon,
a measurement device configured to measure samples in the plurality of sample containers for each sample container;
a locking device configured to lock the first sample tray of the plurality of sample trays to the mounting unit at a position where none of the plurality of sample containers on the first sample tray can be replaced, and
a storage unit of an information processing apparatus, the storage unit for storing, for each user, a set value for authorization to unlock the first sample tray during an operation period, and
wherein the control method comprises:
locking the first sample tray during the operation period from a start of a measurement operation on the first sample tray to measure the samples in the plurality of sample containers until an end of the measurement operation,
determining whether to unlock the first sample tray during the operation period, based on the set value, and
unlocking the first sample tray during the operation period, based on a determination of the information processing apparatus;
wherein the information processing apparatus is configured to register an order of measuring samples in the plurality of sample containers placed on the plurality of sample trays and a user who uses the plurality of sample trays, and
wherein the analysis system is configured to select the first sample tray of the plurality of sample trays to be used by a registered user and to perform the measurement of the samples in a first registered order of the first sample tray as registered by the information processing apparatus.

* * * * *